United States Patent

Eysel

Patent Number: 5,947,658
Date of Patent: Sep. 7, 1999

[54] TOOLHEAD FOR CUTTING WORKPIECES AND METHOD OF MANUFACTURING SAME

[75] Inventor: Dieter Eysel, Maintal, Germany

[73] Assignee: Samson Aktiengesellschaft, Frankfurt/Main, Germany

[21] Appl. No.: 08/941,243

[22] Filed: Sep. 30, 1997

[30] Foreign Application Priority Data

Sep. 30, 1996 [DE] Germany ............................ 196 40 280

[51] Int. Cl.⁶ .................................................. B23B 51/00
[52] U.S. Cl. ............................. 408/147; 82/1.5; 408/180
[58] Field of Search ........................... 407/73, 76; 82/1.5, 82/1.4, 1.3, 1.2, 131; 408/144, 146, 147, 156, 154, 17, 158, 159, 150; 76/108.6, 108.1, 115

[56] References Cited

U.S. PATENT DOCUMENTS

| | | | |
|---|---|---|---|
| 2,266,339 | 12/1941 | Shutz | 408/156 |
| 3,097,548 | 7/1963 | Johnson | 408/156 |
| 3,282,133 | 11/1966 | Dickinson et al. | 408/156 |
| 5,491,559 | 2/1996 | Buechler | 358/299 |

FOREIGN PATENT DOCUMENTS

| | | |
|---|---|---|
| 195 10 249 | of 0000 | Germany . |
| 32 45 053 | 6/1983 | Germany . |
| 44 01 0496 | 8/1995 | Germany . |
| 1310118 | 5/1987 | Sweden ................. 408/147 |
| 1404187 | 6/1988 | Sweden ..................... 82/1.2 |
| 1814987 | 5/1993 | Sweden ..................... 82/1.2 |

Primary Examiner—Andrea L. Pitts
Assistant Examiner—Adesh Bhargava
Attorney, Agent, or Firm—Evenson, McKeown, Edwards & Lenahan, P.L.L.C.

[57] ABSTRACT

A tool head for the precision cutting of a surface of a rotating workpiece has a cutting tool which is movable in opposition to the force of a restoring spring from an initial position into an operating position with respect to the workpiece via an actuating drive. The actuating drive is formed by a translatorily movable driving element and a transfer element which converts the driving movement into an adjusting movement. The driving element used for adjusting the cutting tool from the initial position to a machining position is formed by an expansion bar actuated by magnetostrictive principles.

20 Claims, 6 Drawing Sheets

TOOLHEAD FOR CUTTING WORKPIECES AND METHOD OF MANUFACTURING SAME

BACKGROUND AND SUMMARY OF THE INVENTION

This application claims the priority of German patent document 196 40 280.8, the disclosure of which is expressly incorporated by reference herein.

This invention relates to a toolhead for the precision cutting of a surface of a workpiece, and a method of manufacturing the same.

A toolhead of this type is known from German patent document DE 44 01 496. The toolhead is used in the precision machining of internal and/or external geometrical shapes of a workpiece with the toolhead or the workpiece rotating during the machining. The toolhead has an elastically movable joint in the form of a solid body, around which a tool bar connected thereto is pivotable. The tool bar is provided at the free end with a cutting tool for cutting the workpiece.

The solid joint is U-shaped in cross section. One leg of the solid joint is connected to a tool spindle or a tool holder, the other leg with the tool bar and both legs are connected by a web through which the pivot axis of the solid joint passes. The leg connected with the tool bar is elastically pivotable, around the pivot axis, in relation to the leg connected with the tool spindle or the tool holder.

The leg of the U-shaped solid joint which is connected with the toolbar is subject to the action of a piezo transducer which exerts on that leg of the solid joint which is connected with the tool bar a higher or lower force according to the applied electric voltage. The piezo transducer thus generates the control force required for the adjustment from an initial position to a cutting machining position.

The U-shaped solid joint at the same time forms a restoring spring which, on the reduction of the pressure generated by the piezo transducer, pivots back into a starting position, causing the tool bar with the cutting tool to follow.

This construction provides an extremely accurate method of cutting different shapes by means of a rotating or stationary tool, such as circular as well as non-circular geometrical shaped workpieces having any desired external profile contour.

Non-circular and also non-cylindrical workpiece geometry calls for deflections of the cutting tool with different control distances over 360° of a workpiece or toolhead rotation. Piezo transducers, however, can only be subjected to compressive force, as the quartz or the connection with the necessary mechanical force transfer element allows only slight tensile forces to be imparted.

With the known type of toolhead this drawback is overcome by causing the piezo transducer to subject the solid joint only to compressive forces which enables one leg to be elastically pivoted in relation to the other. As the maximum deformation is well within the elasticity range of the material of the solid joint, such as steel, the joint is automatically restored to the initial position, as previously referred to, when the compressive force generated by the piezo transducer is removed or reduced. In order to ensure that no undefined deformation state can occur a suitable prestressing is adopted.

A toolhead of this kind suffers from the drawback that the behavior of a piezo transducer can be compared to that of an electrical capacitor and this then sets limits to the sphere of applicability and increases the control and regulating cost. Furthermore, high operating voltages are involved, so that transformers are required.

German patent document DE 32 45 053 makes known a machine tool with an adjusting device for a cutting tool which is mounted on a tool bar which consists of two elongated interconnected members of different magnetostrictive materials and which is surrounded by an electric coil generating a magnetic field. The tool bar serves as an actuating drive for pivoting the cutting tool. The magnetostrictive change in length produced by the two members of the tool bar on application of a magnetic held, for example the expansion of one and shrinkage of the other, or differences in the respective expansions or shrinkages of the two members, cause the aforementioned deflection of the cutting tool. The tool bar with the cutting tool is bent by the magnetic field and thus directly deflected.

This construction can produce a hysteresis resulting from two materials operating in opposition to each other and having different expansion coefficients. Furthermore, the production of the combination of materials with the use of adhesives or by welding is an expensive process.

An object of this invention is to provide a toolhead which will be simpler to use and in which the aforementioned drawbacks are avoided. In particular, the toolhead can be easily adaptable to existing frame conditions.

This and other goals have been met according to the present invention by providing a toolhead for precision cutting of a surface of a workpiece during a rotation of the toolhead or of the workpiece, the toolhead incorporating a cutting tool which is movable against a restoring spring force from an initial position to an adjusted position with respect to the workpiece by means of an actuating drive which comprises a translatory movable driving element and a transfer element which converts the driving movement into an adjusting movement, wherein the driving element for the adjusting movement of the cutting tool from the initial position into an adjusted position comprises an axially positively magnetostrictive expansion bar which is made in one piece and which is associated with an adjustable force transmission element by means of which the initial position of the cutting tool and the prestressing or preloading of the restoring spring force are continuously adjustable.

The above-stated and other goals have also been met according to the present invention by providing a toolhead, comprising: a base portion; a driven element coupled to the base portion, said driven element being movable relative to the base portion and being biased by a restoring spring force toward said base portion; a magnetostrictive expansion bar fixedly coupled to said base portion, said expansion bar being selectively engageable with said driven element to move said driven element away from said base portion.

This and other goals have also been met according to the present invention by providing a method of manufacturing a toolhead, comprising the steps of: forming a base portion; coupling a driven element to the base portion such that said driven element is movable relative to the base portion and is biased by a restoring spring force toward said base portion; and fixedly coupling a magnetostrictive expansion bar to said base portion such that said expansion bar is selectively engageable with said driven element to move said driven element away from said base portion.

This invention is based on the realization that ferromagnetic bodies undergo reversible changes in length through magnetic reversal and that this effect can be utilized to produce an adjusting force for a cutting tool. The magnetostriction can be positive—extension in the magnetization direction, for example using iron—or negative—shortening in the magnetization direction, for example using nickel. By the use of the magnetostriction effect for the actuating drive of a toolhead it is rendered easily adaptable to standard operating voltages (5v, 24v, 220v . . . ), thus also enabling a simple electrical control system to be used of low cost, for example by the switching current using low voltage transistors.

High adjusting frequencies are also obtainable using the electric magnetic field of the magnetostrictive actuating drive, providing a wide range of shapes using a simple control system.

According to the choice of material for the extension bar, relatively large length changes and adjusting forces are obtainable. The adjusting movement of the cutting tool can thus be adopted in a simple manner to requirements arising in practice.

By means of an adjustable force transmission element associated with the expansion bar, the initial position of the cutting tool and the prestressing of the restoring spring can be continuously adjusted, so that not only the feed movement but also the return movement of the cutting tool can be optimized. Any desired contour shapes can now be reproduced in a simple manner. Continuous adjustment is necessary for adaptation to different conditions of use, different operating temperatures and the desired behavior of the restoring spring.

In this system the drive for the adjusting movement of the cutting chisel from the initial position into a machining position is generated by axial positive magnetostriction.

The drive for the adjusting movement from a machining position in the direction of the starting position is generated by cancelling the axial positive magnetostriction and also by the restoring spring. This ensures that the adjusting movement from a machining position towards the starting position can mainly be effected without any time lag.

The continuous adjustment of the cutting tool not only enables any desired contours to be produced but also enables the cutting tool to be readjusted during the cutting process, without any breaks or flaws in the surface shape to be obtained. Very tiny adjustment steps are rendered possible with maximum frequencies.

In order, in particular, to ensure accurate machining of the workpiece, the adjusting movement of the cutting tool is controlled. For this purpose a measuring element is provided, serving to detect the adjusting movement of the cutting tool and forming part of a control and/or regulating device for adjusting the position of the cutting tool.

For the production of certain contours and shapes, the cutting tool performs at least two different adjusting movements per rotation, adjusting speeds of 1 to 10 kHz being obtainable. The adjusting movement distances are in the range 0–200 $\mu$m. The regulating distance can be increased with the use of transfer elements. The adjusting movement of the cutting tool preferably takes place about an axis perpendicular to the longitudinal axis of the tool bar.

In a toolhead according to this invention this object can be easily attained with a restoring spring formed by a machined metal part subdivided by at least one horizontal recess into a base and a driven element, these latter being interconnected by a web. In particular, the web concerned is arranged eccentrically, so that the driven element, in the event of positive magnetostriction, is pivoted with respect to the base around a swivel axis situated eccentrically with respect to the rotation axis and passing through the web.

Other objects, advantages and novel features of the present invention will become apparent from the following detailed description of the invention when considered in conjunction with the accompanying drawings.

DETAILED DESCRIPTION OF THE DRAWINGS

Figure 1:
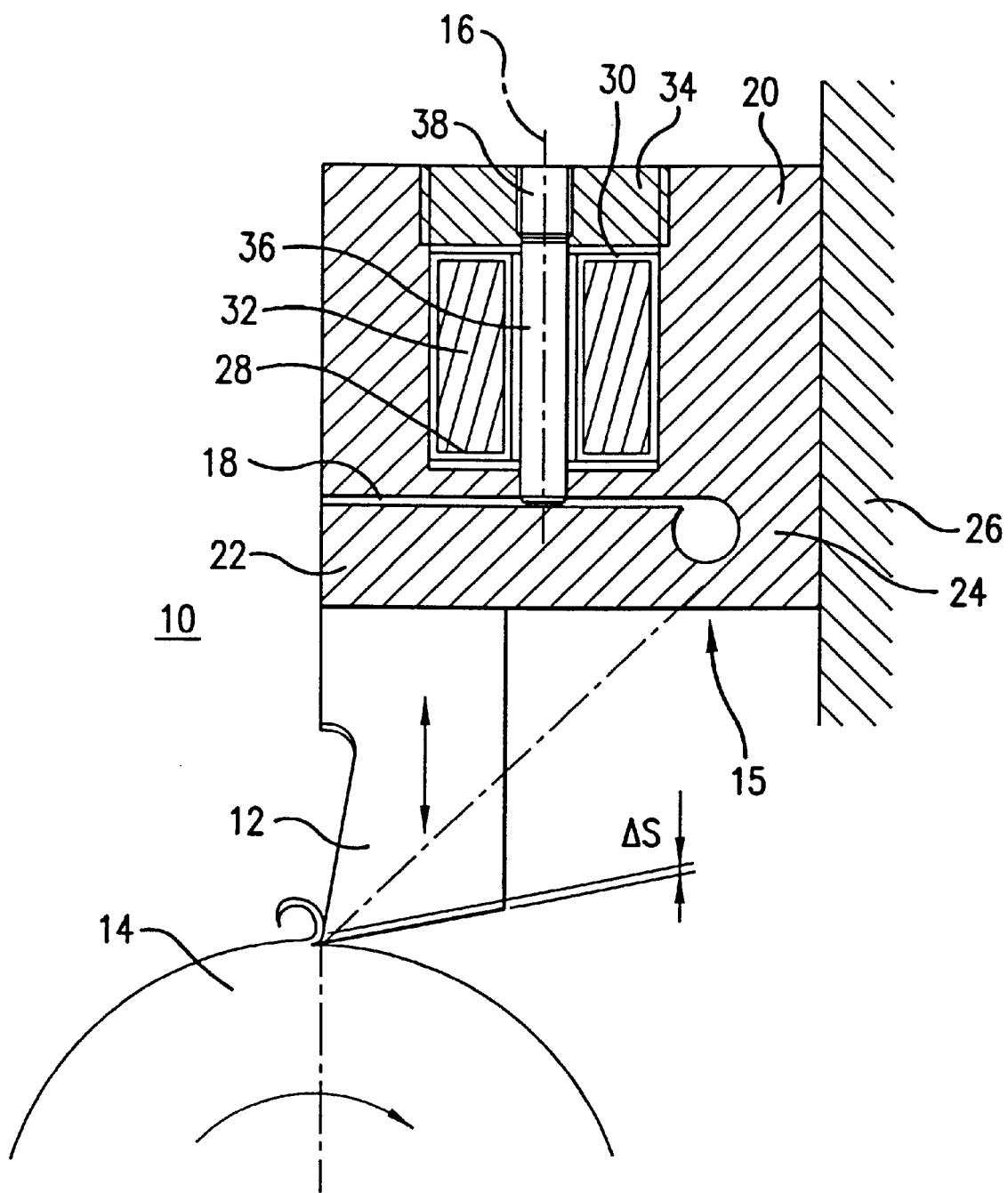
FIG. 1 shows a section through a toolhead during the machining of a workpiece, according to a first embodiment of this invention.

FIG. 1 shows a tool head 10 according to a first embodiment of this invention forming part of a lathe not shown here in detail. The tool head 10 is provided with a cutting tool 12 of which the cutting edge engages a rotating workpiece 14 for cutting purposes. The workpiece 14 is clamped into a head spindle, not shown in the drawing. The longitudinal axis 16 of the tool head 10 is perpendicular to the rotation axis of the workpiece 14.

In a direction substantially perpendicular to the longitudinal axis 16 of the tool head 10 and the rotation axis of the workpiece 14 the cutting tool extends downwards from the tool head 10. The cutting edge engages the workpiece 14 rotating about the rotational axis and cuts the said workpiece to an extent depending on the position of the said cutting tool 12.

The tool head 10, consisting of a machined part, comprises a base 20 and restoring spring 15 provided with a gap or recess 18 which is perpendicular to the longitudinal axis 16 and which subdivides the machined part into the base 20 and the restoring spring 15 which forms the movable driven element 22. The base 20 and the driven element 22 are interconnected by a web 24 positioned eccentrically in relation to the longitudinal axis 16. The restoring spring 15 is connected via a flange to a tool slide 26 by base 20.

The base 20 contains a bore 28 which is concentric with the longitudinal axis 16 and which extends towards the recess 18. The bore 28 embraces an axially secured ring plate 30, an electric exciter coil (or excitation coil) 32 connected thereto and a closure or cover 34 immediately following the latter and screwed into the said bore.

The cover 34, the exciter coil 32 and the ring plate 30 surround an expansion bar 36 of magnetostrictive material such as Terfenol-D concentric thereto, a force transmission element 38 is screwed into the closure 34 and bears against an end of the expansion bar 36. By removing the cover 34 screwed into the bore 28 and the force transmission element 38 screwed into the cover 34, the expansion bar 36 can be removed and replaced without difficulty, for example by an expansion bar 36 with different magnetostrictive characteristics. The tool head 10 is thus simply and rapidly adaptable to particular manufacturing requirements, such as a desired maximum adjusting travel.

By turning the force transmission element 38 a prestressing or preload can, if necessary, be applied continuously to the expansion bar 36 and the cutting chisel 12 set to the desired initial position. The force transmission element 38 thus serves as an adjustable stop for the said expansion bar 36, which latter, after being set, is secured in the customary manner so that it does not rotate out of place.

That end of the expansion bar 36 which is furthest from the force transmission element 38 bears directly against the driven element 22.

The driven element 22 is elastically pivotable in relation to the base 20 about an imaginary swivel axis passing through the web 24, the cutting tool 12 being pivotable with it, as a result of which the position of the said cutting tool 12 changes in relation to the rotation surface of the workpiece 10 14.

The exciter coil 32 with the expansion bar 36 of magnetostrictive material serves as an actuating drive for setting the cutting tool 12 in relation to the rotation surface of the workpiece 14.

In an initial position not shown here the cutting tool 12 is situated a distance from the workpiece 14. When a voltage is applied to the exciter coil 32 an axial positive magnetostriction occurs, that is the expansion bar 36 expands axially and generates a translatory driving moment by which the driven element 22 and the cutting tool 12 are pivoted about the swivel axis passing through the web 24, in relation to the base section 20 and into an operating position, as shown in the drawing.

For the adjusting movement of the cutting tool 12 from an operating position in the direction of the starting position the voltage in the exciter coil 32 is reduced, whereupon the expansion caused in the bar 36 by the magnetostriction decreases and the resilience built up in the restoring spring 15 by the elastic deformation pivots the cutting tool 12 in the direction of the starting position as the expansion decreases.

The driven element 22 forms, in view of the actuating drive constituted by the exciter coil 32 and the expansion bar 36 resting against the said driven element 22, a transfer element which converts the driven element into an adjusting movement.

With the magnetostrictive actuating drive a number of different adjusting movements can be generated for each revolution of the workpiece, so that a wide variety of external contours can be produced on the workpiece 14.

For certain materials and machining parameters it may be appropriate to break the chip produced by the turning process. For this purpose the cutting tool 12 is temporarily raised, as shown by the broken line, and then pivoted back onto the original position.

Figure 2:
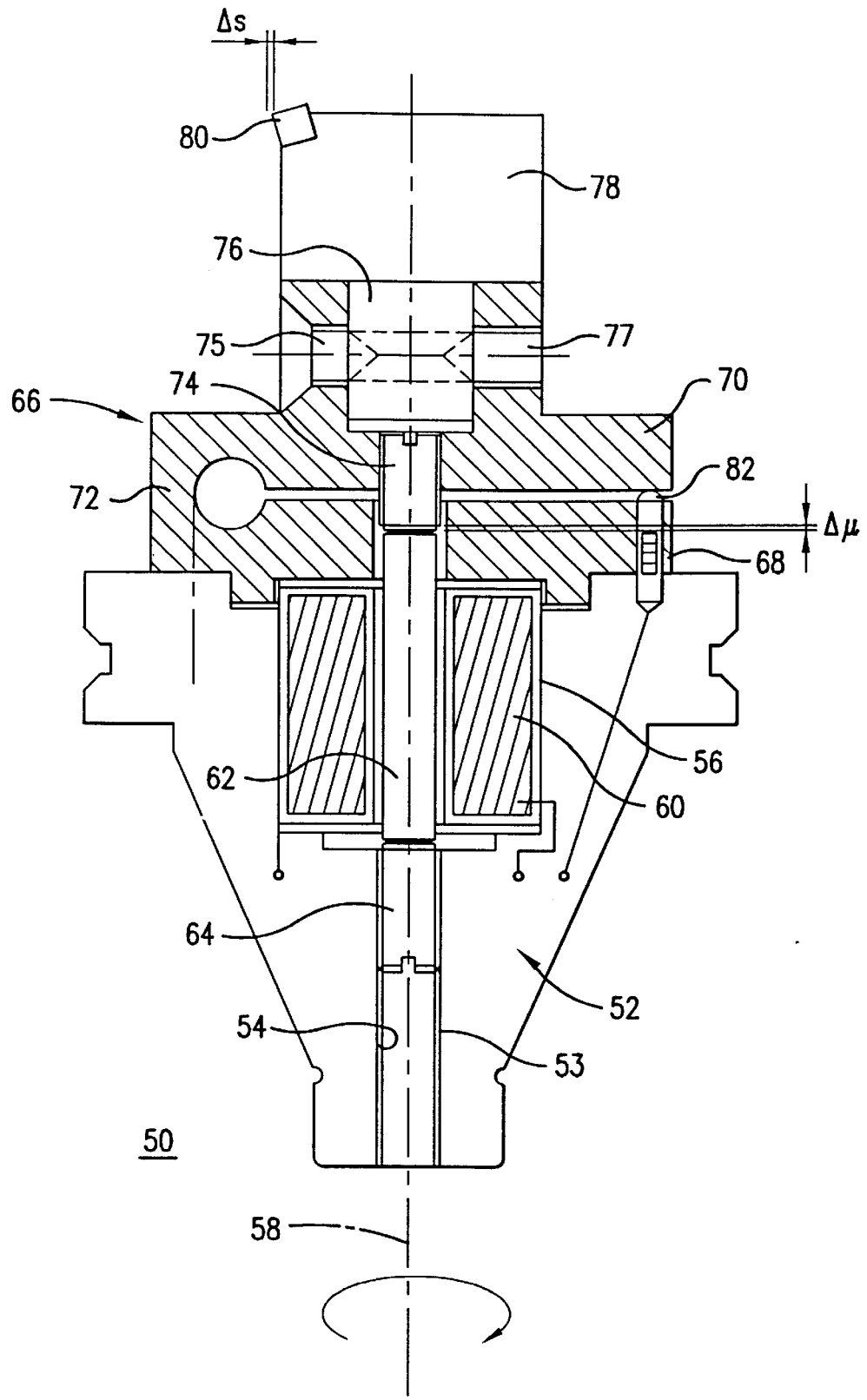
FIG. 2 shows a toolhead according to a second embodiment of this invention.

FIG. 2 shows a further tool head having a rotating drill head 50 with a taper sleeve 52 for connection to conventional machining centers. The taper sleeve 52 has a bore 54 followed by a recess 56 which are positioned concentrically with the longitudinal and rotation axis 58 of the drill head 50.

The recess 56 which is open towards the wide side of the taper sleeve 52 contains an electric exciter coil 60 and also an expansion bar 62 concentric therewith. A fixed adjustable stop 64 is screwed into the bore 54 which has a thread 53 and bears against the expansion bar 62. By screwing in the stop 64 a prestressing or preload can be exerted on the expansion bar 62. The stop 64, after adjustment, can be secured in the conventional manner so that it does not rotate out of place.

At that end of the taper sleeve 52 which is further away from the machining center a U-shaped restoring spring 66, consisting of a base 68 and a driven element 70, is connected to the taper sleeve 52 via a flange. The U-shaped restoring spring 66 with the base 68 and the driven element 70 and web 72, interconnecting the base and the driven element and positioned eccentrically with respect to the rotation axis 58, is constructed similarly, from the functional point of view, to the restoring spring 15 of the tool head 10 in the first embodiment of this invention described in connection with FIG. 1. The driven element 70 is elastically pivotable in the manner described, about an imaginary swivel axis passing through the web 72, in relation to the base 68.

The expansion bar 62 engages the section 68 of the restoring spring 66 and bears against an adjustable force transmission element 74 which, after adjustment, can be secured in the conventional manner against undesired rotation. The cylindrically constructed force transmission element 74 rests by the end furthest away from the expansion bar 62 against a journal 76 associated with a boring bar 78 and engaging the driven element 70 and secured therein by a pin 77. The cutting tool 80 is secured on one side at the free end of the boring bar 78. In this version likewise the expansion bar 62, by releasing the boring bar 78 or removing the stop 64, can be easily removed and replaced by an expansion bar with different magnetostrictive characteristics.

On that side of the restoring spring 66 which is furthest away from the web 72 a measuring device is provided in the form of a travel sensor 82, which detects the deflection performed by the driven element 70, in relation to the base about the swivel axis passing through the web 72, and which thus measures the adjusting movement of the cutting tool 80.

The travel sensor 82 forms part of a control and regulating device which enables an accurate and controlled adjusting movement of the cutting tool 80 to take place in accordance with the rotation of the drill head 50 about the rotation axis 58.

For the introduction of the boring bar 78 with the cutting tool 80 into a bore to be machined in the workpiece 14 (FIG. 3) the initial position of the cutting tool is selected to ensure that a contactless relative movement can take place between the said cutting tool 80 and said workpiece 14.

Figure 3A:
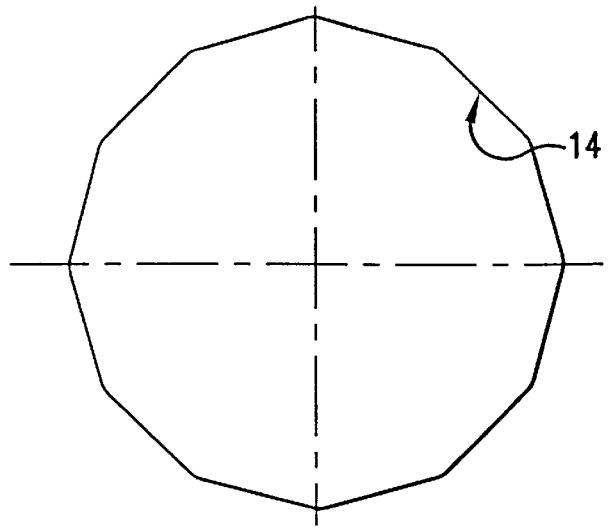
FIGS. 3a to 3c show sectional view of internal contours produced using the toolhead according to this invention.
Figure 3B:
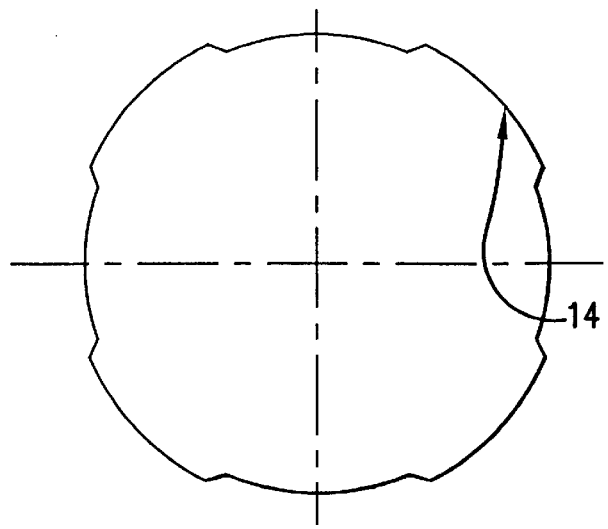
Figure 3C:
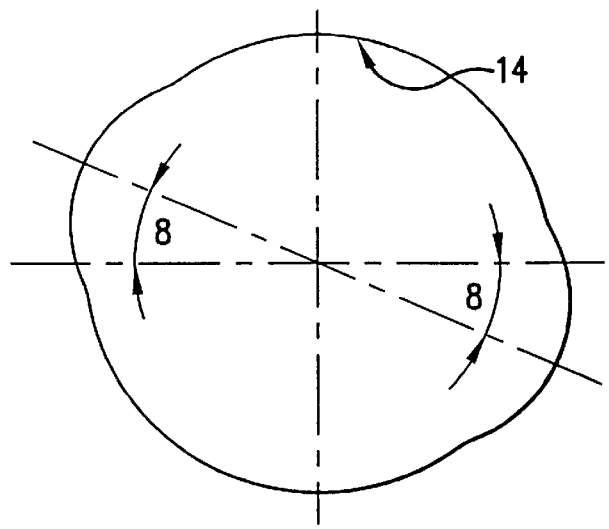

In FIG. 3a different contours of a workpiece 14 machined using the drill head 50 are shown in section. The contours can be axially symmetrical, point-symmetrical or asymmetrical and may include recesses, ellipses or polygons.

The drill head 50 enables internal contours of these types to be easily produced in one single operation without any change of tool.

Figure 4:
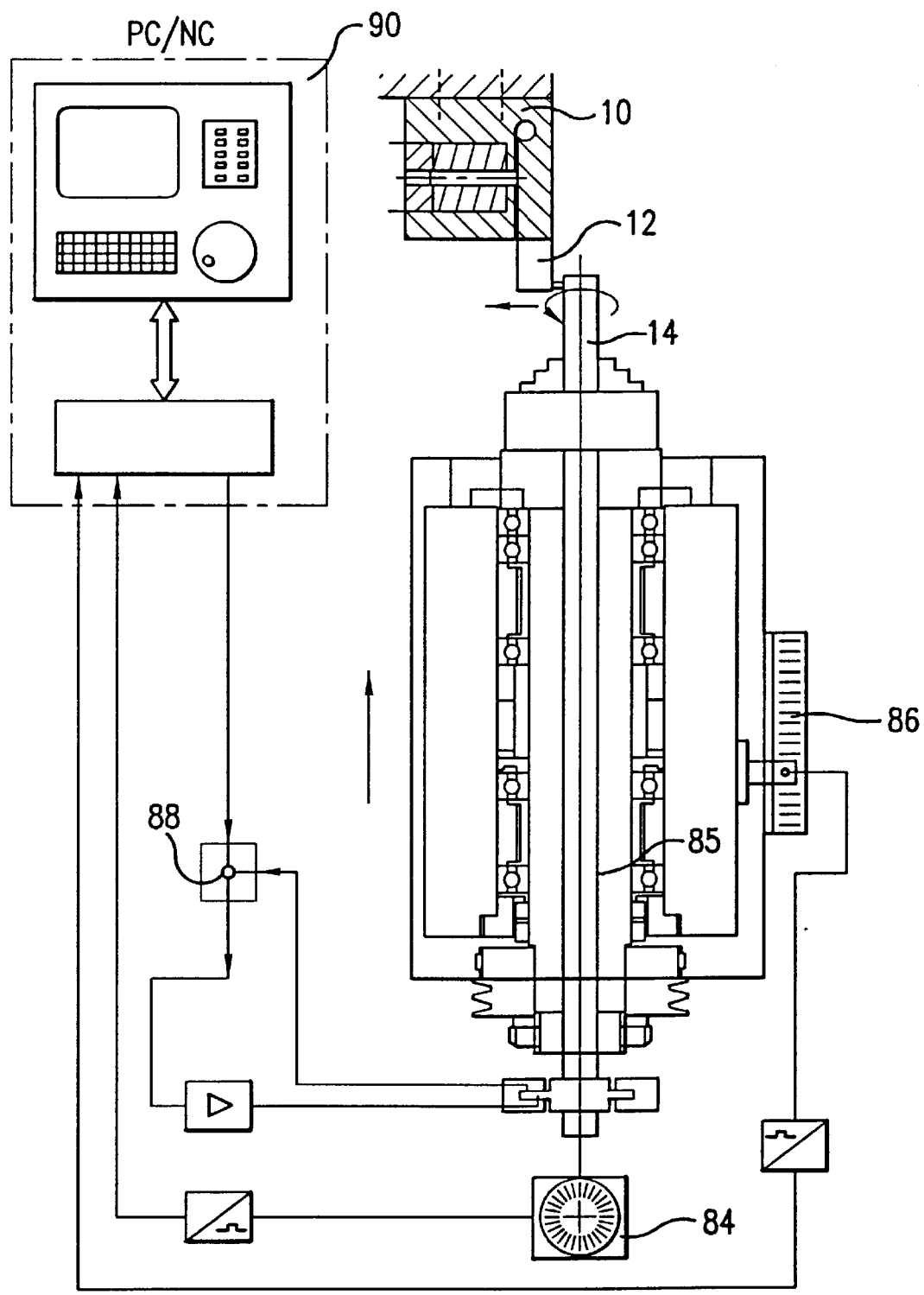
FIG. 4 shows a schematic diagram of a control and regulating device for the tool head according to a further embodiment of this invention.
Figure 5:
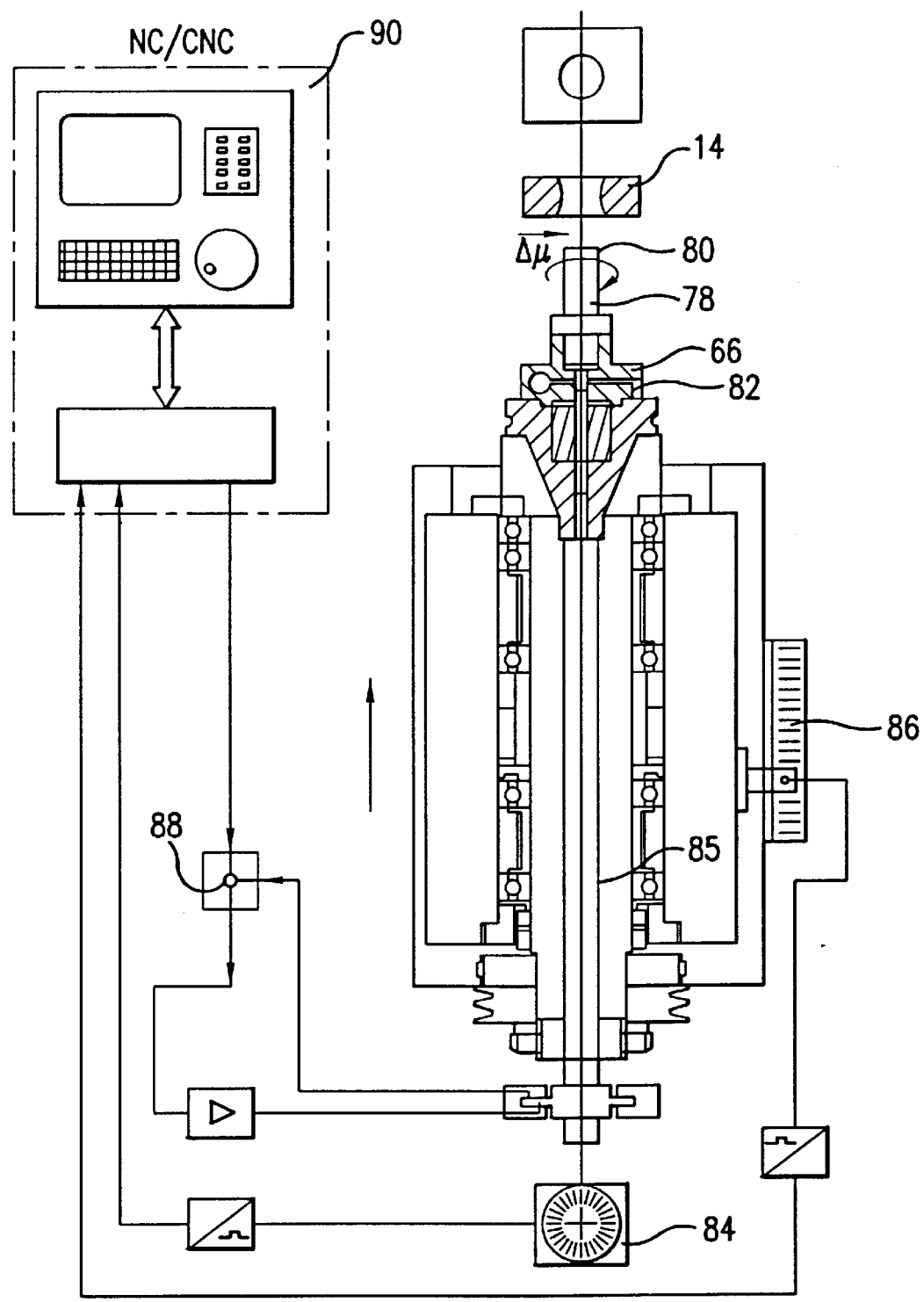
FIG. 5 shows a schematic diagram of a control and regulating device according to a further embodiment of this invention.

FIGS. 4 and 5 show in each case schematically the control and regulating device of a further version of a tool head according to this invention and, for a lathe (FIG. 4) and a drilling machine (FIG. 5) which are comparable to the embodiments described in conjunction with FIGS. 1 and 2 respectively.

In the lathe according to FIG. 4, the angular position of the cutting tool 12 in relation to the workpiece 14 is determined by means of an angular position measuring system 84 on the head spindle 85 and the axial position of the cutting tool 12 in relation to the workpiece 14 is determined by a means of a distance measuring system 86 on the tool slide 26 bearing the tool head 10. The measuring elements, for example the travel sensor 82, detect the actual value, which is compared in a control unit 88 with the desired value. The control signal is then adapted accordingly. The adjusting movement of the cutting tool 12 is regulated by this means.

The regulation of the adjusting movement of the cutting tool 12 makes it possible to compensate workpiece or tool spindle eccentricities, differences in cutting tool loadings, thermal displacement of the tool head 10 and the like tolerances.

The lathe is controlled by a computer 90, into which the data for the desired external contour of the workpiece 14 is fed.

In corresponding fashion the control is effected for the case of the drilling machine shown in FIG. 5 with the drill head 50, the same reference numbers having been used as for corresponding components in the second embodiment described in connection with FIG. 2.

The transmission of the measuring signal in both versions can be effected with the use of slip rings.

Figure 6:
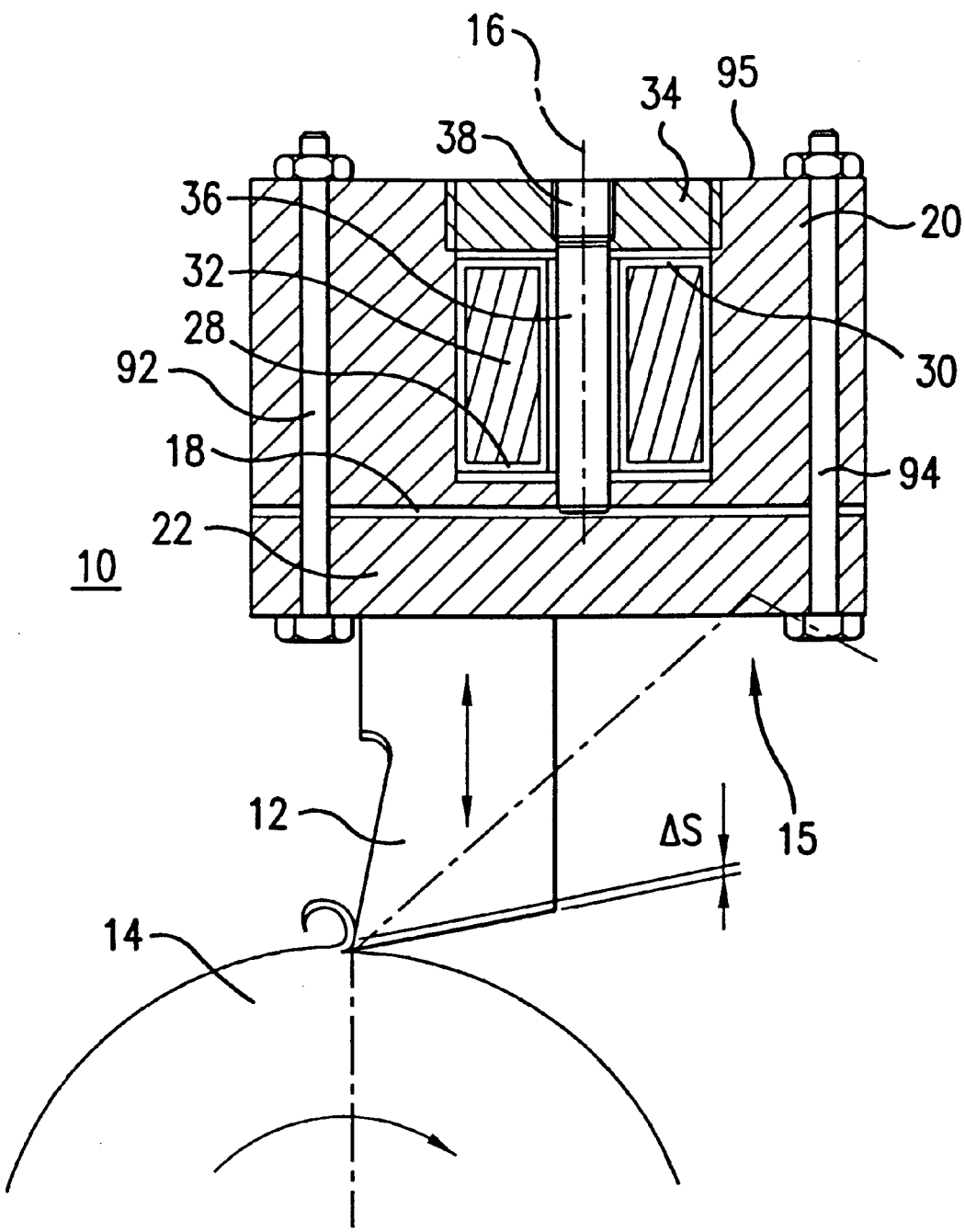
FIG. 6 shows a toolhead according to a further embodiment of this invention.

In a further embodiment of the invention shown in FIG. 6, the adjusting movement for a lathe, for example, may take place in the operating direction of the translatory drive of the expansion bar. The restoring spring can then be formed from two axially secured plates 20, 22 interconnected by expansion screws 92, 94, one plate 22 serving as a force transmission element/transfer element. End 95 of plate 22 is connected with the tool side. The expansion bar of the magnetostrictive adjusting drive then rests directly or indirectly against the transfer element and acts on this latter when the electric voltage increases. The expansion screws are adjusted resiliently in the operating direction of the magnetostriction, i.e. in the direction of the longitudinal axis of the expansion bar, and when the positive magnetostriction is cancelled the transmission element together with the cutting tool affixed thereto is pressed back in the direction of the starting position by the expansion screws.

The invention is characterized by the fact that the adjusting drive can be adapted in a simple manner to existing operating conditions. Adjusting rates of 1–10 kHz are obtainable by magnetostrictive actuating drives according to this invention. Adjustment distances ranging from 0 to 200 μm can be obtained, according to the transmission elements used, such as the U-shaped restoring spring 66 shown in FIG. 2.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A toolhead for precision cutting of a surface of a workpiece during a rotation of one of the toolhead and the workpiece about a rotational axis, said toolhead including a cutting tool which is movable against a restoring spring force from an initial position to an adjusted position relative to the workpiece via an actuating drive which comprises a translatory movable driving element and a transfer element which converts a driving movement of the driving element into an adjusting movement of the cutting tool from the initial position into the adjusted position, the driving element comprising an axially positively magnetostrictive expansion bar which is made in one piece and which is associated with an adjustable force transmission element via which the initial position of the cutting tool and a preloading of the restoring spring force are continuously adjustable.

2. A toolhead according to claim 1, wherein the driving element acts perpendicularly to said rotational axis.

3. A toolhead according to claim 1, wherein the driving element is coaxial with said rotational axis.

4. A toolhead according to claim 1, wherein the actuating drive comprises an exciter coil and an expansion bar of magnetostrictive material which is positioned concentrically within the exciter coil and which bears on one side against a stop and on the other side against the transfer element.

5. A toolhead according to claim 1, wherein a measuring element is provided to measure the adjusting movement of the cutting tool, said measuring element forming part of at least one of a control system and a regulating system for adjusting the position of the cutting tool.

6. A toolhead according to claim 5, wherein the at least one of a control system and a regulating system for adjusting the position of the cutting tool is arranged to perform at least two different adjusting movements per rotation.

7. A toolhead according to claim 4, wherein the expansion bar comprises a rare earth and a metal/iron compound.

8. A toolhead according to claim 4, wherein the expansion bar comprises Terfenol-D.

9. A toolhead according to claim 1, wherein the restoring spring force is provided by an integral resilient part formed by at least one recess or cut in a base part carrying the cutting tool, the resilient part and the base part being interconnected by a web.

10. A toolhead according to claim 9, wherein the web is positioned eccentrically relative to said rotational axis such that the resilient part is pivotable relative to the base about an imaginary axis passing through the web under a positive magnetostriction movement.

11. A toolhead according to claim 4, wherein the expansion bar is removable and replaceable.

12. A toolhead according to claim 1, wherein the adjusting movement of the cutting tool serves to break a chip formed by the cutting tool on the workpiece.

13. A toolhead, comprising:
a base portion;
a driven element coupled to the base portion, said driven element being movable relative to the base portion and being biased by a restoring spring force toward said base portion;
a magnetostrictive expansion bar fixedly coupled to said base portion, said expansion bar being selectively engageable with said driven element to move said driven element away from said base portion; and
an adjustable force transmission element adjustably engageable with the magnetostrictive expansion bar, an initial position of the driven element and a preloading of the restoring spring force being continuously adjustable via said adjustable force transmission element.

14. A toolhead according to claim 13, wherein a cutting tool is coupled to said driven element, said cutting tool being movable against said restoring spring force from an initial position to an adjusted position relative to a workpiece via said magnetostrictive expansion bar.

15. A toolhead according to claim 13, wherein said driven element and said base portion are formed from a single continuous piece of material, said driven element and said base portion being defined by a recess formed in said single continuous piece of material which extends from a side thereof to an interior location of said single continuous piece of material, said interior location defining a web of said single continuous piece of material which connects said driven element and said base portion, wherein said web creates said restoring spring force due to resilience of said material.

16. A toolhead according to claim 14, wherein said driven element and said base portion are formed from a single continuous piece of material, said driven element and said base portion being defined by a recess formed in said single continuous piece of material which extends from a side thereof to an interior location of said single continuous piece of material, said interior location defining a web of said single continuous piece of material which connects said driven element and said base portion, wherein said web creates said restoring spring force due to resilience of said material.

17. A method of manufacturing a toolhead, comprising the steps of:

forming a base portion;

coupling a driven element to the base portion such that said driven element is movable relative to the base portion and is biased by a restoring spring force toward said base portion;

fixedly coupling a magnetostrictive expansion bar to said base portion such that said expansion bar is selectively engageable with said driven element to move said driven element away from said base portion; and adjustably engaging an adjustable force transmission element with the magnetostrictive expansion bar such that an initial position of the driven element and a preloading of the restoring spring force is continuously adjustable via said adjustable force transmission element.

18. A method according to claim 17, further comprising the step of:

coupling a cutting tool to said driven element such that said cutting tool is movable against said restoring spring force from an initial position to an adjusted position relative to a workpiece via said magnetostrictive expansion bar.

19. A method according to claim 17, wherein said driven element and said base portion are formed from a single continuous piece of material, said driven element and said base portion being defined by a recess formed in said single continuous piece of material which extends from a side thereof to an interior location of said single continuous piece of material, said interior location defining a web of said single continuous piece of material which connects said driven element and said base portion, wherein said web creates said restoring spring force due to resilience of said material.

20. A method according to claim 18, wherein said driven element and said base portion are formed from a single continuous piece of material, said driven element and said base portion being defined by a recess formed in said single continuous piece of material which extends from a side thereof to an interior location of said single continuous piece of material, said interior location defining a web of said single continuous piece of material which connects said driven element and said base portion, wherein said web creates said restoring spring force due to resilience of said material.

* * * * *